J. E. ARMITSTEAD.
VALVE STRUCTURE FOR FLUSH TANKS.
APPLICATION FILED APR. 13, 1915.
1,201,233.
Patented Oct. 17, 1916.
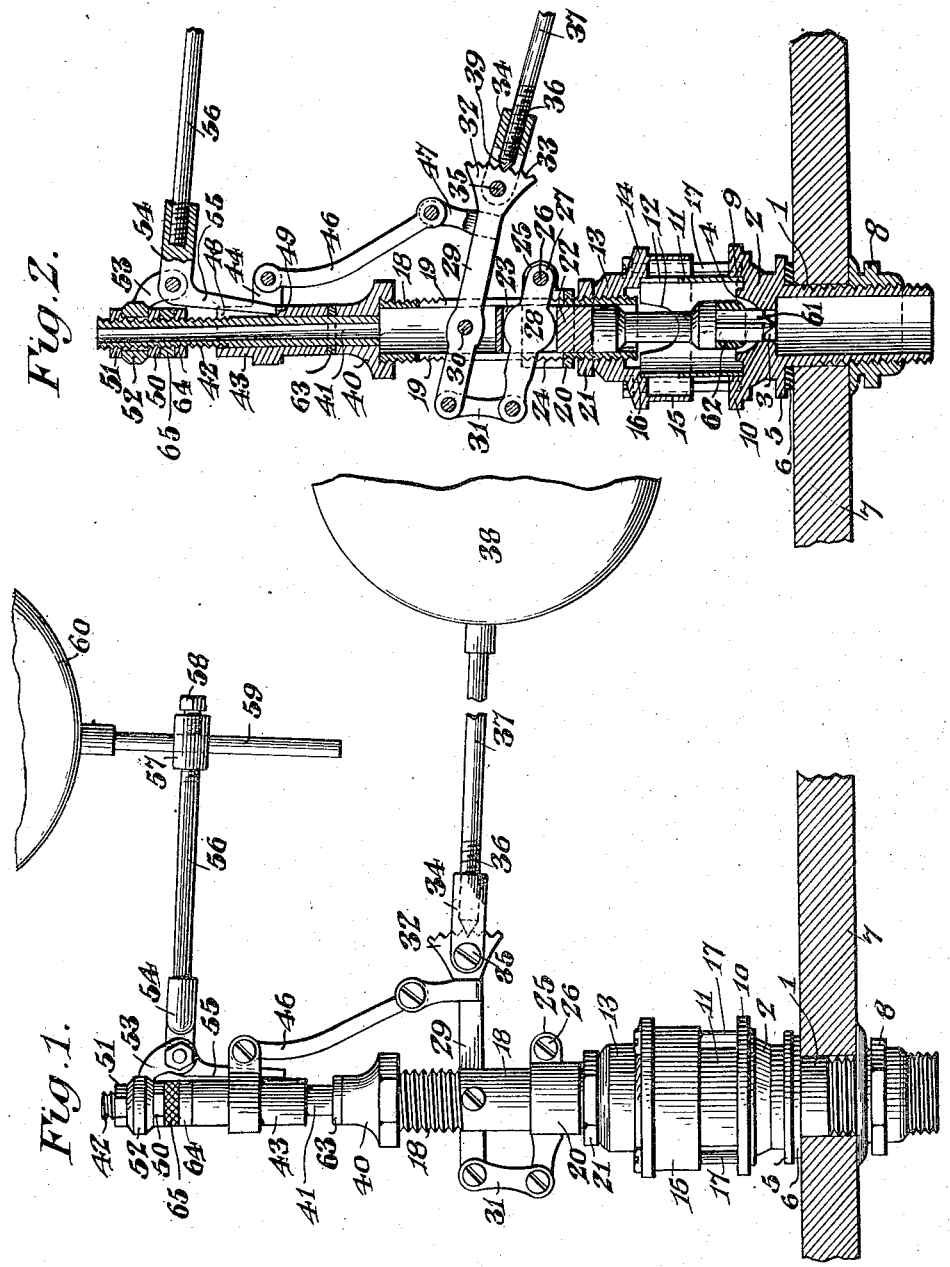
J. E. Armitstead, INVENTOR
WITNESSES

UNITED STATES PATENT OFFICE.

JOHN E. ARMITSTEAD, OF PROVO, UTAH.

VALVE STRUCTURE FOR FLUSH-TANKS.

1,201,233.  Specification of Letters Patent.  Patented Oct. 17, 1916.

Application filed April 13, 1915. Serial No. 21,091.

*To all whom it may concern:*

Be it known that I, JOHN E. ARMITSTEAD, a citizen of the United States, residing at Provo, in the county of Utah and State of Utah, have invented a new and useful Valve Structure for Flush-Tanks, of which the following is a specification.

This invention has reference to valve structures for flush tanks, and its object is to provide a means whereby the rate of inflow will remain substantially constant until the tank is filled to the desired point, and then the valve will close suddenly.

In the usual valve structure for flush tanks a float responsive to rising and lowering levels of water in the tank controls the inlet valve, so that the valve is, especially toward the final stages of the filling operation, progressively and slowly closed, wherefore, the filling is correspondingly slowed down and such slow closing produces objectionable noises.

In accordance with the present invention the controlling valve is as usual controlled by a float and it may be further provided with a silencer, while another float is provided, and this second float controls a latch mechanism holding the first float and the valve controlled thereby in a position preventing the closing of the valve until the water level reaches the second float located higher than the first float. When the second float is operated by the rising water it unlatches the first float which at such time is wholly, or to a great extent submerged and consequently the lifting force exerted by the water engaging the first float is sufficient to cause the first float to rise very suddenly when once released and thereby close the valve with correspondingly great speed, and, moreover, the closure of the valve may be with sufficient force to effectively seal the inlet.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is an elevation of the improved valve structure in the position of the parts when the tank is full of water and the valve is closed. Fig. 2 is a longitudinal vertical diametric section of the valve structure showing the position assumed by the parts when the valve is open.

Referring to the drawings there is shown a nipple member 1 formed at one end into a head 2 having an axial passage 3 therethrough terminating in a valve seat 4. The nipple member is provided with an exterior flange 5 adjacent to the head designed to confine a packing washer 6 against the bottom member 7 of a tank, the nipple being suitably exteriorly threaded for the reception of a clamp nut 8, as is customary. The bottom member 7 may be taken as indicative of any suitable tank and it is not deemed necessary to show the tank in any detail. That end of the head 2 terminating in the valve seat 4 is formed on the end face with a circular channel 9 and an outstanding flange 10. Seated at one end in the channel 9 is a cylindrical shell 11 having the end remote from the seat, which end may be termed the upper end since the whole structure is usually upright, formed with a series of recesses or notches 12 of considerable depth. Applied to the upper end of the shell 11 is a head 13 having at its bottom end an exterior circumferential flange 14 formed with a skirt 15 and also on the same end formed with a rabbet 16 into which the upper end of the shell 11 is seated. The skirt 15 is of sufficient internal diameter to surround the recessed upper end of the shell 11 in spaced relation thereto, and the length of the skirt is such that its bottom end is spaced from the upper face of the head 2. Screws or bolts 17 serve to secure the head 13 to the shell 11 and clamp the latter against the head 2, the screws being threaded into the head 2. The head 13 has a central axial passage therethrough internally threaded and into this threaded end there is screwed the threaded end of a pipe or tube 18 of appropriate length, said pipe or tube being provided on diametrically opposite sides with longitudinally arranged elongated slots 19. At the end of the pipe where it screws into the head 13 there is applied to its exterior an internally threaded collar 20, and between this collar and the head 13 the tube 18 carries a lock nut 21.

Fitted to and slidable within the tube 18 is a valve stem 22 provided with a diametric slot 23 in position to communicate with the slots 19. The collar 20 is also provided with diametric slots 24 matching the slots 19 and opening through the upper end of the collar. On opposite sides of one of the slots the collar 20 is provided with a pair of ears 25 and pivoted between these ears by a pivot pin 26 is an arm 27 formed intermediate of its length with an enlargement 28 preferably of disk form and adapted to the slot 23, so that on rocking the arm 27 about the pivot 26 the enlargement 28 will impart a reciprocatory movement to the valve stem 22.

Extending through the slots 19 is a lever 29 pivoted to the tube by a pivot pin 30 which may be in the form of a bolt. The lever 29 and the arm 27 are in substantially parallelism, and are connected by a link 31 pivoted at one end to that end of the arm 27 remote from the pivot 26, and at the other end the link 31 is pivoted to the corresponding end of the lever 29. The lever 29 has its other end 32 laterally extended and provided on the outer edge with notches 33 forming corresponding teeth. Straddling the expanded end or head 32 of the lever 29 is a yoke 34 held to the lever by a pivot pin 35, and this yoke is threaded for the reception of the threaded end 36 of a rod 37 carrying a float 38 at the end remote from the threaded end. The rod 37 at the threaded end is pointed as shown at 39 to engage in any one of the notches 33, wherefore on unscrewing the rod 37 for an appropriate distance the yoke and the rod may be adjusted about the pivot pin 37 into alinement with or into angular relations to the lever 29.

Applied to the upper end of the tube 18, which is appropriately threaded for the purpose, is a cap 40 carrying an axially extended rod or tube 41 exteriorly threaded, as shown at 42, at the end remote from the cap 40.

Slidable lengthwise of the rod 41 which may or may not be a solid rod, and may or may not be formed in one piece with the cap 40, is a sleeve 43 having a pair of radially projecting ears 44 at one side. Between these ears is pivoted one end of a link 46, and the other end of this link is pivoted between ears 47 fast to and projecting laterally from the lever 29 near the expanded end 32 thereof. The sleeve 43 is provided in line with the space between the ears 44 with a longitudinal groove or recess 48 forming at the lower end a shoulder 49 between the ears 44. Applied to the threaded end 42 of the rod 41 are nuts 50, 51 between which there is lodged a collar 52 from one side of which ears 53 project. Carried by and pivoted between these ears is an angle arm 54 having one end formed into an elongated nose 55 adapted to enter the slot 48 and engage the shoulder 49, or to pass between the ears 44 in the space between the link 46 and the sleeve 43. The other end of the angle arm 54 is threaded for the reception of a rod 56 carrying at the end remote from the threaded end a coupling 57 entered by a set screw 58 and traversed laterally by another rod 59 carrying a float 60.

The valve stem 22 has guide wings 61 at the lower end in entering relation to the passage 3 and also carries a valve 62 which may be made of some suitable material, such as rubber, and this valve is adapted to the valve seat 4. The length of the rod 41 between the nuts 40 and 50 is sufficient to permit a considerable extent of travel of the sleeve 43 between them, and in order to prevent metallic contact and consequent noise, elastic or other suitable washers 63, 64 are applied to the rod 41 adjacent to the nuts 40 and 50.

Let it be assumed that the tank is empty and in this case the floats 38 and 60 fall to the lowest position to which their adjustment permits. These positions are shown in Fig. 2, and under the conditions assumed the valve 62 is in the raised or open position. Water supplied through the nipple 1 finds ready access to the tank through the passage 3 then open, since the valve 62 is raised, and from thence the water passes into the shell 11 through the openings 12 and by way of the tortuous passage defined by the skirt 15 into the interior of the tank between the skirt 15 and the head 2. This travel of the water is conducive to noiseless inflow. The water continues to flow freely into the tank until ultimately it reaches the float 38 and if not prevented the rising water would cause the float 38 to rise, thus depressing the arm 27 and correspondingly seating the valve. Such action would be productive of unpleasant noises which might be described as sizzing noises. However, when the float 38 is in the lowermost position the action of the lever 29 by the link 46 with the sleeve 43 carries said sleeve downwardly until its further progress is arrested by the buffer washer 63. This lowering movement is sufficient to carry the shoulder 49 below the nose 55, and since the arm 54 is overbalanced by the float 60 the nose 55 at once moves into the slot 48 and against the rod 41 where the nose is then in the path of the shoulder 49. The result of this is that the float 38 is locked by the engagement of the nose 55 against the shoulder 49, so that the float cannot rise with the rising level of the water. The valve 62 therefore remains in its full open position and the water flows into the tank with full force. This procedure continues until ultimately the level of water is sufficient to reach the float 60, whereupon the latter is lifted and thus rocks the arm 54, so that the nose 55 is carried toward the link 46 and out of the path of the shoulder 49. At this time there is a strong lifting force being exerted upon the float 38 which may be so adjusted as to be submerged either wholly or to so great an extent as will cause a strong lifting force to be exerted upon it. Consequently as soon as the float 38 is released from the locking or retaining action of the nose 55 it rises with great rapidity, so that the movement may be described as instantaneous and the valve 62 is moved from practically the full open position to the full closed position at once. The result of this is that the full flow of water continues throughout the filling operation and is suddenly arrested by the quick and full closing of the valve which is instantaneously moved from the full open to the full closed positions and all noises caused by the slow throttling of the inlet port are prevented. Moreover, the filling of the tank is much more rapid than is customary, since the inlet valve remains full open throughout the filling operation.

The construction provides for various adjustments. For instance, the tube or pipe 18 is adjustable lengthwise of the head 13 and may be locked in the adjusted positions by the nut 21. This brings about appropriate adjustments of the valve 62 to its seat, while the collar 20 also provides for some longitudinal adjustment of the valve. The nuts 50 and 51 provide for a suitable adjustment of the collar 52 along the rod 41, so that the nose 55 may be brought into such relation to the shoulder 49 that there is no material lost motion of the float 38 when the nose 55 is in the path of the shoulder 49. A slight play is, of course, advantageous since great nicety of adjustment is not obligatory. Furthermore, the float 38 is readily adjustable with relation to its rise and fall from and toward the body of the tank by locking it in different relations to the lever 29. The float 60 is also capable of various adjustments with relation to the rod 56. By means of these various adjustments the depth of water which will fill into the tank may be very readily determined.

While the invention has been described as applicable to flush tanks, it will be understood that it is applicable to other tanks and may be used in other situations where a rising level of water or other fluid may be made to operate a valve. The terms valve or valve structure for flush tanks are therefore not to be taken as limiting the invention to the type of tanks known as flush tanks, nor is the term water which has been used for convenience of description to be taken as limiting the use of the invention to water controlling valves.

It is sometimes advisable to cause a small flow of water into the flush tank to prevent freezing. For this purpose a nut 65, knurled for ready manipulation, is applied to the threaded portion of the rod or tube 41 between the nut 50 and the washer 64, so that the rise of the sleeve 43 may be adjustably restricted. By this means the travel of the valve 62 may be so adjusted that in the closed position there is a very small leak by it, thus producing enough flow of water continuously into the tank to overcome any tendency to freeze.

An advantage of the present invention is that it does away with the reseal tube used in flush tanks of toilets.

What is claimed is:—

1. A valve structure for controlling the inflow of fluid into a tank, comprising an upright support, a valve within the support at a low point thereof, a float for closing the valve when the tank is full, a reciprocatory latch member mounted on and movable lengthwise of the upright support with its direction of movement corresponding to that of the float, another float, and a carrier for the second float mounted on the support and movable into and out of the path of the latch member for holding the first float against rising with the rising level of fluid until the fluid reaches and actuates the second float.

2. A valve structure for tanks, comprising an upright support, a valve carried by the support, a float provided with an arm pivotally connected to the support and to the valve for closing the valve by a rising movement of the float, a reciprocable latch member mounted on the support and movable lengthwise thereof, with connections between the latch member and float for causing the latch member to move in the same direction as the float, and another float provided with a carrying arm pivoted to the support at a higher point than the latch member and movable into and out of the path of the latter to hold the latch member and the first float against rising movements until the level of fluid in the tank has risen to a point to actuate the second-named float.

3. A valve structure for tanks comprising a reciprocable valve, an upright member carrying the valve and provided with a seat for the valve, a rock arm connected to and controlling the valve, a rock lever connected to the rock arm for moving the valve into and out of its seat, a float carried by the lever, a latch member mounted on the upright member and reciprocable lengthwise of the latter, said latch member being connected to the lever carrying the float and movable with and in the same direction as the float, a rock arm carried by the upright member and having a latch portion movable into and out of the path of the first-named latch member, and a float carried by the second-named rock arm at a higher point than the first-named float.

4. A valve structure for tanks comprising a reciprocable valve, an upright member carrying the valve and provided with a seat for the valve, a rock arm connected to and controlling the valve, a rock lever connected to the rock arm for moving the valve into and out of its seat, a float carried by the lever, a latch member mounted on the upright member and reciprocable lengthwise of the latter, connections between the latch member and the lever carrying the float and movable with and in the same direction as the float, a rock arm carried by the upright member and having a latch portion movable into and out of the path of the first-named latch member, and a float carried by the second-named rock arm at a higher point than the first-named float, said latch members being coactively related to restrict movements of the second-named float and the rock arm carrying it.

5. In a valve structure for controlling the fluid inlet to a tank, a nipple member having means for attachment to the tank and provided with a valve seat, a shell separate from and carried by the nipple member and having the end remote from the nipple member marginally recessed, a cap member applied to and carried by the recessed end of the shell and having a skirt in surrounding and covering relation to the recessed end of the shell and in spaced relation to the nipple member, connecting means between the cap and nipple members for clamping the shell, a valve movable into and out of the valve seat, and means for operating the valve.

6. In a valve structure for controlling the fluid inlet to a tank, a nipple member having means for attachment to the tank and provided with a valve seat, a shell separate from and carried by the nipple member and having the end remote from the nipple member marginally recessed, a cap member applied to and carried by the recessed end of the shell and having a skirt in surrounding and covering relation to the recessed end of the shell and in spaced relation to the nipple member, connecting means between the cap and nipple members for clamping the shell, a valve movable into and out of the valve seat, and means for operating the valve, said valve operating means comprising two floats one directly controlling the valve and the other having holding means for engaging and latching the first-named float against response to rising level of liquid in the tank.

7. A valve structure for controlling the inflow of fluid into a tank, comprising a valve, a float for actuating the valve, a sleeve connected to the float, a threaded rod on which the sleeve is capable of moving, and a nut on the rod in the path of the sleeve for limiting the movement of the valve to the closed position to provide for an anti-freezing leak by the valve.

In testimony that I claim the foregoing as my own, I have hereto affixed my signature in the presence of two witnesses.

JOHN E. ARMITSTEAD.

Witnesses:
 B. D. HATCH,
 R. R. THORNE.

Copies of this patent may be obtained for five cents each, by addressing the "Commissioner of Patents, Washington, D. C."